US010723034B2

(12) United States Patent
Yun et al.

(10) Patent No.: US 10,723,034 B2
(45) Date of Patent: Jul. 28, 2020

(54) LEAD PROCESSING APPARATUS CAPABLE OF PROCESSING ELECTRODE LEAD INTO ROUND SHAPE AND BATTERY CELL INCLUDING ELECTRODE LEAD PROCESSED BY USING THE SAME

(71) Applicant: LG Chem, Ltd., Seoul (KR)

(72) Inventors: Ji Ho Yun, Daejeon (KR); Jae Young Jang, Daejeon (KR)

(73) Assignee: LG CHEM, LTD., Seoul (KR)

(*) Notice: Subject to any disclaimer, the term of this patent is extended or adjusted under 35 U.S.C. 154(b) by 217 days.

(21) Appl. No.: 15/724,592

(22) Filed: Oct. 4, 2017

(65) Prior Publication Data

US 2018/0093388 A1 Apr. 5, 2018

(30) Foreign Application Priority Data

Oct. 4, 2016 (KR) ........................ 10-2016-0127720

(51) Int. Cl.

| | |
|---|---|
| ***H01M 2/16*** | (2006.01) |
| ***H01M 2/18*** | (2006.01) |
| ***B26F 1/14*** | (2006.01) |
| ***H01M 2/30*** | (2006.01) |
| ***H01M 2/02*** | (2006.01) |
| *H01M 10/0525* | (2010.01) |

(52) U.S. Cl.

CPC ............ *B26F 1/14* (2013.01); *H01M 2/0212* (2013.01); *H01M 2/30* (2013.01); *H01M 10/0525* (2013.01); *H01M 2220/30* (2013.01)

(58) Field of Classification Search

CPC ......... B26F 1/14; H01M 2/0212; H01M 2/30; H01M 2220/30; H01M 10/0525

See application file for complete search history.

(56) References Cited

U.S. PATENT DOCUMENTS

| | | | | |
|---|---|---|---|---|
| 5,883,357 | A | 3/1999 | Newman et al. | |
| 2015/0314380 | A1* | 11/2015 | Saito ..................... | B23D 27/00 83/34 |

FOREIGN PATENT DOCUMENTS

| | | | |
|---|---|---|---|
| KR | 20160079227 | A | 7/2016 |

* cited by examiner

*Primary Examiner* — Lisa S Park

(74) *Attorney, Agent, or Firm* — Birch, Stewart, Kolasch & Birch, LLP

(57) ABSTRACT

A lead processing apparatus includes a fixing die configured to maintain a position of a preliminary lead when a portion to be removed of the preliminary lead protrudes from a first end that is one side end and a cutting jig is configured to form the preliminary lead into an electrode lead shape by removing the portion to be cut except for a portion of the preliminary lead coupled to the fixing die, while being actuated in a downward direction with respect to the fixing die. In particular, each of corners of the first end has a round shape on a plane. A portion of the cutting jig, configured to cross the first end during the removal process (e.g., cutting) is performed by actuation in the downward direction is recessed in correspondence to the shape of the first end.

13 Claims, 9 Drawing Sheets

310

300

FIG. 9A
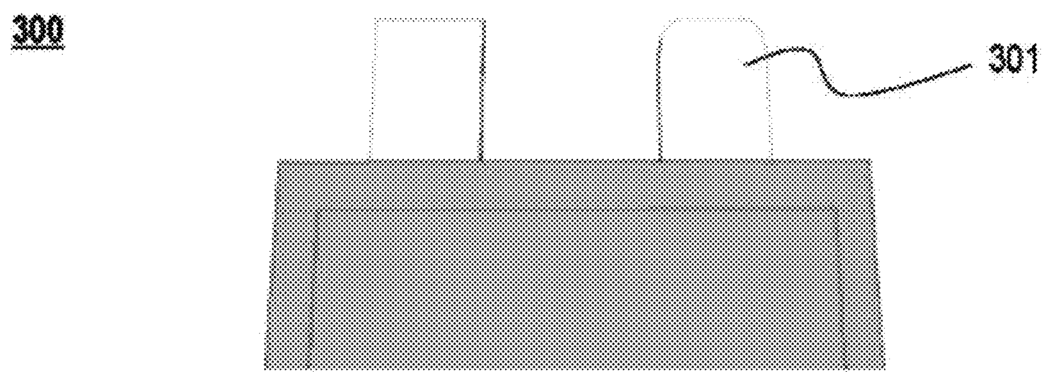
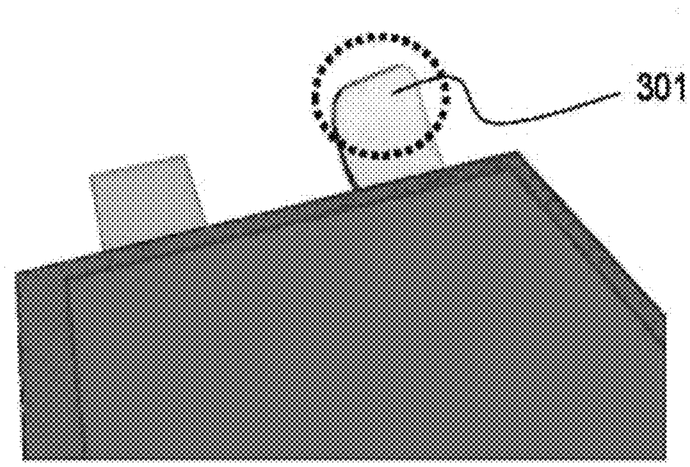
FIG. 9B

LEAD PROCESSING APPARATUS CAPABLE OF PROCESSING ELECTRODE LEAD INTO ROUND SHAPE AND BATTERY CELL INCLUDING ELECTRODE LEAD PROCESSED BY USING THE SAME

CROSS-REFERENCE TO RELATED APPLICATION

This application claims priority to Korean Patent Application No. 10-2016-0127720 filed on Oct. 4, 2016 and all the benefits accruing therefrom under 35 U.S.C. § 119, the contents of which are incorporated by reference in their entirety.

TECHNICAL FIELD

The present disclosure relates to a lead processing apparatus and, more particularly, to a lead processing apparatus for processing an electrode lead into a round shape and a processed battery cell including an electrode lead processed by using the same.

RELATED ART

Recently, as technical development and demands for mobile devices have increased, demands for rechargeable secondary batteries as energy sources have also increased. Accordingly, more research related to the secondary batteries has been carried out to accommodate the changing technological demands. Additionally, the secondary batteries have attracted considerable attention as power sources for an electric vehicle (EV), a hybrid electric vehicle (HEV), and a plug-in hybrid electric vehicle (Plug-In HEV), which have been proposed as solutions for air pollution and the like which are contributed to by the use of conventional gasoline and diesel vehicles that use fossil fuels.

Further, among the secondary batteries, a significant amount of research has been conducted on a lithium secondary batteries having high energy density and discharge voltage which has fostered commercialization of the technology. In particular, a pouch-type lithium secondary battery cell having a reduced thickness in terms of a shape of the battery and having a lamination arrangement is more easily manufactured, and a portion of the shape that is deformable is in high demanded.

The pouch-type battery cell has a structure having an electrode assembly and an electrolytic solution contained in a pouch-type laminate sheet that accommodates the electrode assembly. The laminate sheet may be referred to as 'pouch-type battery case'. Additionally, a resin layer of the laminate sheet may be thermally bonded. In particular, the pouch-type battery cell has a structure that includes the laminate sheet that surrounds the electrode assembly to prevent the electrode assembly from being exposed to the external environment. For example, as heat and pressure are applied to a sealed portion of the laminate sheet that is mutually overlapped at an outer circumferential portion of the battery case, the sheet has a sealing structure. An exemplary structure of the pouch-type battery cell is illustrated in FIG. 1.

Referring to FIG. 1, as shown in the related art, a battery cell 10 has a structure having the outer circumferences of a battery case 14 sealed in a state when electrode leads 11 and 12 protrude to the exterior of the battery case 14. For example, each of the electrode leads 11 and 12 has a shape of a bar formed from an electrically conductive metal material. In particular, the electrode lead has a polygonal shape having angulated corners and conventionally has a rectangular structure. When the electrode leads 11 and 12 are inserted between cutting jigs 21 and 22 that vertically cross each other as illustrated in FIG. 2, the electrode leads 11 and 12 are removed by a predetermined length for to be more easily connected to a printed circuit board (PCB) (not shown) and an external electric device (not shown), and the removed electrode leads 11 and 12 include the cut corners 24 having sharp angles.

However, when the cut electrode leads 11 and 12 are separated from the PCB or the external electric device by impact or vibration, as illustrated in FIG. 3, the sharp corners 24 are bent and cause damage to (e.g., tear) the battery case 14 or generate damage on a circuit or a device of the PCB or the external electric device. Since the damage caused by the electrode lead having the sharp portion causes secondary problems such as ignition of the battery cell and malfunction and breakdown of a device system, techniques for solving the problems are highly demanded.

The above information disclosed in this section is merely for enhancement of understanding of the background of the disclosure and therefore it may contain information that does not form the prior art that is already known in this country to a person of ordinary skill in the art.

SUMMARY

The present disclosure provides an electrode lead processing apparatus having a particular structure to form an electrode lead into a round shape. The present disclosure also provides a battery cell including an electrode lead having a round protruding end that formed by the above apparatus.

In an aspect of an exemplary embodiment of the present disclosure a lead processing apparatus may include an electrode lead for an electric connection of a battery cell having a predetermined length and shape, a fixing die configured to maintain a position of a preliminary lead formed when a portion to be removed from the preliminary lead protrudes from a first end of a side end and a cutting jig configured to form the preliminary lead into an electrode lead shape by removing the portion to be removed while a portion of the preliminary lead, coupled to the fixing die remains, while being actuated in a downward direction with respect to the fixing die. In addition, a plurality of corners of the first end may have a round shape on a plane, and a portion of the cutting jig, which crosses the first end during removal by actuation in the downward direction, may be recessed in correspondence to the shape of the first end.

In some exemplary embodiments, when the cutting jig crosses the fixing die by actuation in the downward direction the preliminary lead may be removed when the round corners of the first end are engaged with the cutting jig and forms an electrode lead having round corners. In another exemplary embodiment, the fixing die may include a first die having the first end and second and third ends respectively extending from both sides of the first end and on which the preliminary lead is seated, a second die integrated with and extending from the second end of the first die and a third die integrated with and extending from the third end The first end may protrude to the exterior with respect to the second and third dies with reference to a length of the preliminary lead, and the cutting jig may simultaneously cross the first end, the second die, and the third die during actuation in the downward direction for cutting.

In another exemplary embodiment, cutting jig may include a jig main body, a pair of guide portions integrated with and extending from the jig main body at positions that correspond to the second die and the third die and first and second curved portions that are curved surfaces extending from the jig main body to the guide portions between the guide portions. A recessed space (e.g., cavity) may be defined by the first and second curved portions and the jig main body between the guide portions crosses the first end of the fixing die during actuation in the downward direction for cutting.

In other exemplary embodiments, during the actuation in the downward direction of the cutting jig, the corners of the electrode lead may be formed by cutting the preliminary lead when the first and second curved portions are engaged with the corner of the first end, and the end of the electrode lead, disposed between the corners, may be formed by cutting the preliminary lead when an extended portion between the corners of the first end is engaged with the jig main body. In some exemplary embodiments, during the actuation in the downward direction of the cutting jig, as the guide portions respectively abut the first and second dies, the cutting jig may be translated in the downward direction with respect to the fixing die. In another exemplary embodiment, during the actuation in the downward direction of the cutting jig, when the preliminary lead is engaged with each of the guide portions at side surfaces of the first end, a portion of side surfaces of the preliminary lead may be removed.

In another exemplary embodiment, a first aperture through which a gas flows and a plurality of second apertures branched from the first aperture may be defined in the first die, openings respectively communicated with the second apertures are perforated in a surface of the first die, and a vacuum pump for pneumatic pressure drop may be coupled to the first aperture. In some exemplary embodiments, an interior of each of the first and second apertures may be converted into a vacuum state by the vacuum pump when the preliminary lead abuts the first die to seal the apertures, and the preliminary lead may be coupled to the first die by a vacuum pressure during the vacuum state.

In other exemplary embodiments, on a vertical cross-section of the fixing die, the second die may protrude in an upward direction with respect to a surface of the first die with the first die and the second die forming a first stepped portion with respect to each other, and the third die may protrude in an upward direction with respect to the surface of the first die with the first die and the third die forming a second stepped portion with respect to each other. In another exemplary embodiment, the preliminary lead may be disposed (e.g., seated) on the first die when the preliminary lead abuts the first and second stepped portions and may be obstructed from moving by the first and second stepped portions during actuation in the downward direction of the cutting jig.

In another exemplary embodiment, a distance between the first and second stepped portions may be about 99% to 100% of a width of the preliminary lead, and a protruding height of each of the first and second stepped portions may be about 100% to 110% of a thickness of the preliminary lead. In some exemplary embodiments, the round shape may have a radius of curvature in the range of about 10R to 100R.

In another aspect of the present disclosure a battery cell comprising an electrode lead processed by the lead processing apparatus may include each of the corners of the electrode lead with a round shape having a radius of curvature in the range of about 10R to 100R on the plane.

BRIEF DESCRIPTION OF THE DRAWINGS

Exemplary embodiments can be understood in more detail from the following description taken in conjunction with the accompanying drawings, in which:

FIGS. 9A and 9B are exemplary views of a battery cell in accordance with in accordance with an exemplary embodiment of the present disclosure.

DETAILED DESCRIPTION

Figure 1:
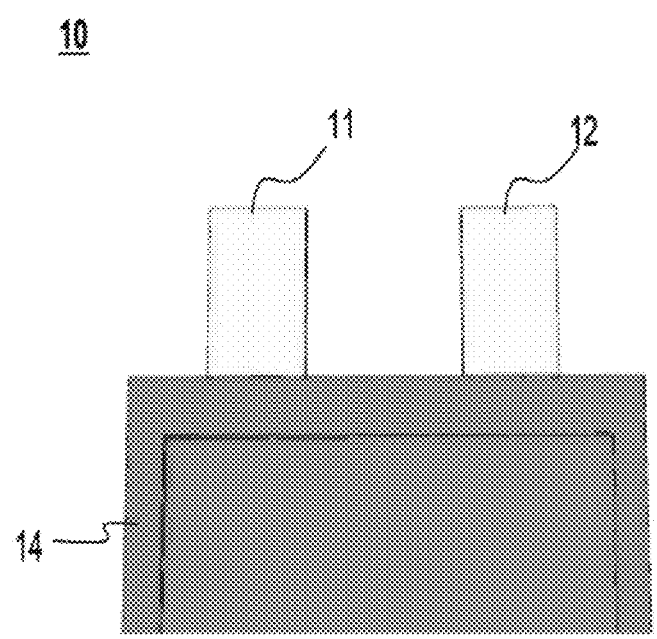
FIG. 1 is an exemplary view of a battery cell in accordance with a related art.
Figure 2:
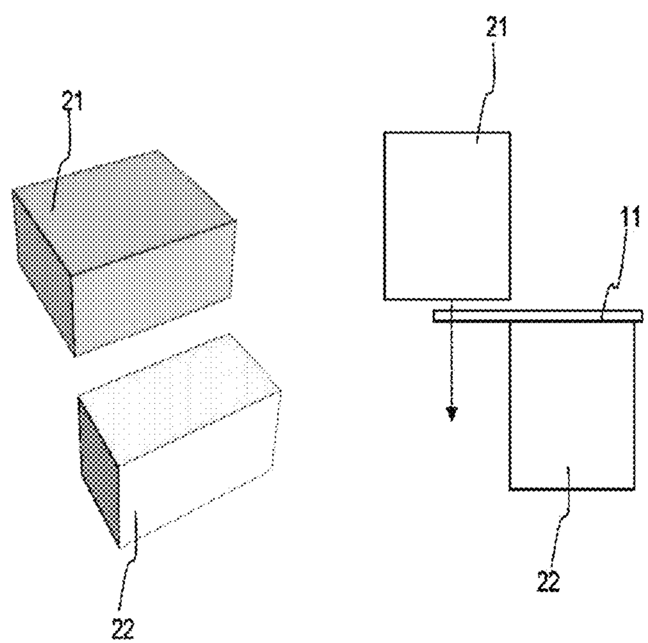
FIG. 2 is an exemplary view of a lead processing apparatus in accordance with a related art.
Figure 3:
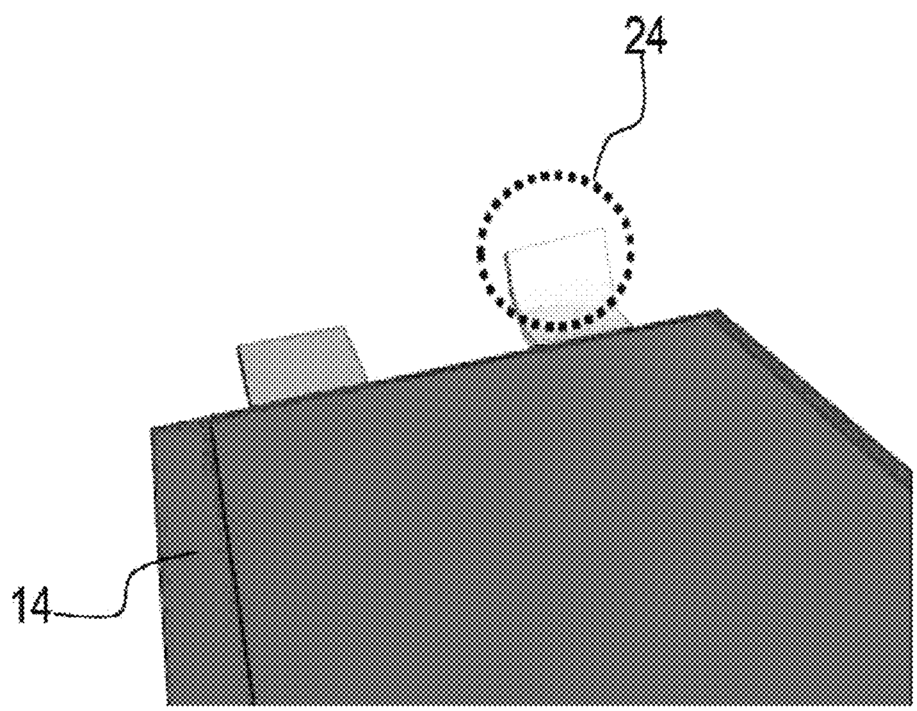
FIG. 3 is an exemplary view of a battery cell processed by the lead processing apparatus in FIG. 2 according to the related art.

Hereinafter, specific embodiments will be described in detail with reference to the accompanying drawings. The present disclosure may, however, be embodied in different forms and should not be construed as limited to the embodiments set forth herein.

Hereinafter, embodiments of the present disclosure will be described with reference to the accompanying drawings. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In accordance with an exemplary embodiment, a lead processing apparatus that forms an electrode lead may include an electric connection of a battery cell to have a predetermined length and shape, a fixing die configured to couple a preliminary lead when a portion to be removed of the preliminary lead protrudes from a first end that is a side end and a cutting jig configured to form the preliminary lead into an electrode lead shape by removing the portion to be cut from a portion of the preliminary lead, coupled to the fixing die, while being actuated in a downward direction with respect to the fixing die. In particular, each of corners of the first end may have a round shape on a plane, and a portion of the cutting jig, which crosses the first end when cutting is performed by actuation in the downward direction may be recessed to correspond to the shape of the first end.

In describing in more detail that the electrode lead may be processed to form the round structure by using the lead processing apparatus in accordance with an exemplary embodiment, when the cutting jig crosses the fixing die by movement in a downward direction (e.g., the downward movement) for cutting, the preliminary lead may be removed (e.g., cut) when the round corners of the first end are engaged with the cutting jig and may be formed into an electrode lead having round corners.

In particular, since the first end of the fixing die and the recessed portion of the cutting jig cross in a mutually corresponding manner at a cutting portion of the preliminary lead, and the shape of crossing thereof has the round structure on the plane, the lead processing apparatus in accordance with an exemplary embodiment may form the electrode lead having the round structure by removing (e.g., cutting) the preliminary lead in correspondence thereto. Although the electrode lead, that may be removed as described above, is separated from a PCB or an external electronic device by an external force (e.g., impact or vibration) since the corners having the round structure may not damage (e.g., tear) a battery case or may not damage a circuit or a device of the PCB or the external electric device, the electrode lead may not degrade the stability of the battery cell. The battery cell will be descried in more detail as follows Further, the fixing die may include a first die having the first end and second and third ends respectively extending from both sides of the first end that the the preliminary lead is disposed on, a second die integrated with and extending from the second end of the first die and a third die integrated with and extending from the third end in an integrated manner. For example, the first end may protrude to the exterior with respect to the second and third dies with reference to a length of the preliminary lead. The cutting jig may simultaneously cross the first end, the second die, and the third die during actuation in the downward direction (e.g., the downward movement) for cutting.

The cutting jig may include a jig main body, a pair of guide portions integrated with and extending from the jig main body at positions respectively corresponding to the second die and the third die and first and second curved portions that are curved surfaces extending from the jig main body to the guide portions between the guide portions. In particular, a recessed space defined by the first and second curved portions and the jig main body between the guide portions may cross the first end of the fixing die during actuation in the downward direction (e.g., the downward movement) for cutting.

In the above-described structure, during the downward movement of the cutting jig, the corners of the electrode lead may be formed by removing the preliminary lead when the first and second curved portions are engaged with the corner of the first end, and the end of the electrode lead disposed between the corners, may be formed by removing the preliminary lead when an extended portion between the corners of the first end are engaged with the jig main body.

In other words, when the preliminary lead is supported on the first end having round corners, as the cutting jig having a planar shape corresponding thereto moves in a downward direction, the rest portion except for the supported portion of the preliminary lead may be engaged with the cutting jig and the fixing die. The preliminary lead may be formed into the electrode lead having the round structure. After the cutting, the corners and the electrode lead and the end may abut in interior surfaces of the first and second curved portions and the jig main body in a recessed space (e.g., cavity) defined by the inner surfaces of the first and second curved portions and the jig main body of the cutting jig. In some exemplary embodiments, lubricant oil or punch oil may be disposed between the cutting jig and the fixing jig to prevent excessive friction heat from occurring on the electrode lead because the electrode lead abuts the inner surfaces of the first and second curved portions and the jig main body.

During the actuation in the downward direction of the cutting jig, as the guide portions respectively abut the first and second dies, the cutting jig may be induced to move downward with respect to the fixing die. Additionally, during the downward movement of the cutting jig, as the preliminary lead is engaged with each of the guide portions at side surfaces of the first end, a portion of side surfaces of the preliminary lead may be removed. The fixing die may include at least two structures to maintain the position of the preliminary lead to prevent displacement of the preliminary lead during the cutting process, which will be described in detail through non-limited examples as follows.

In an exemplary embodiment, a first aperture through which a gas flows and a plurality of second apertures branched from the first aperture may be defined in the first die. Additionally, openings respectively communicated with the second apertures may be perforated in a surface of the first die. A vacuum pump for pneumatic pressure drop may be connected to the first aperture. Accordingly, an interior of each of the first and second apertures may be converted into a vacuum state by the vacuum pump when the preliminary lead abuts the first die to seal the openings. The preliminary lead may be fixed on the first die by a vacuum pressure in accordance with the vacuum state. When the preliminary lead is firmly fixed by a suction pressure defined in the second aperture in the surface of the first die, although the cutting die applies a force to the preliminary lead, the preliminary lead may maintain a position where the preliminary lead is supported on the first die and be accurately formed in a desired electrode lead shape.

In an exemplary embodiment, on a vertical cross-section of the fixing die, the second die may protrude in an upward direction with respect to a surface of the first die to enable the first die and the second die to form a first stepped portion with respect to each other. The third die may protrude upward in an upward direction with respect to the surface of the first die to enable the first die and the third die to form a second stepped portion with respect to each other. Through the above-described structure, the preliminary lead may be seated (e.g., disposed) on the first die in when the preliminary lead abuts the first and second stepped portions and may be prevented from being displaced by the first and second stepped portions during the actuation in the downward direction of the cutting jig.

A distance between the first and second stepped portions may be about 99% to 100% of a width of the preliminary lead to couple the preliminary lead therebetween. Since the first and second stepped portions are necessarily coupled in an interference fit manner when the distance is less than a minimum value of the above range, the preliminary lead may be damaged during the coupling process. When the electrode lead is not fixed between the first and second stepped portions when the distance is greater than a maximum value of the range, the preliminary lead may be displaced when the cutting jig moves in a downward direction. A protruding height of each of the first and second stepped portions may be about 100% to 110% of a thickness of the preliminary lead.

When the protruding height is less than the thickness of the preliminary lead, the preliminary lead may be displaced from the first or second stepped portion and distorted during the cutting process. Further, when the protruding height is greater than about 110% of the range, the preliminary lead may not be easily inserted between the first and second stepped portions. Accordingly, when the preliminary lead is not easily coupled between the first and second stepped portions when the preliminary lead abuts the surface of the first die, an advantage achieved by converting the first and second apertures into the vacuum state, i.e., the fixing force caused by the suction pressure, may not be used, which is undesirable.

In an exemplary embodiment, the round shape may represent a round shape having a radius of curvature of about 10R to 100R. In the range of the radius of curvature, as the radius of curvature decreases, the corner may approach to a right angle. On the contrary, as the radius of curvature increases, the corner may have a further rounded shape.

In particular, when the radius of curvature is less than a minimum value of the range of radius of curvature, the corner substantially may not have the round structure and effects intended in accordance with an exemplary embodiment may not be achieved. When the radius of curvature is greater than the range of radius of curvature, the end of the electrode lead may have an excessively rounded shape and the electrode lead may not be easily coupled to the PCB or a surface area for welding the device decreases. The unit for the radius of curvature may be mm or cm, or determined by a size of the electrode lead.

Additionally, in an exemplary embodiment, a battery cell including the electrode lead processed by the lead processing apparatus may be provided. In detail, the battery cell may include the electrode lead having a radius of curvature of about 10R to 100R on the plane. In other words, when the electrode lead is separated from a PCB or an external electronic device by an external force such as impact or vibration, the rounded structure of the corners may not damage a battery case or may not damage a circuit or a device of the PCB or the external electric device, the electrode lead may not degrade the stability of the battery cell.

Although a type of the battery cell is not particularly limited, a specific example of the batter cell may include a lithium secondary battery such as a lithium ion battery and a lithium ion polymer battery having high energy density, high discharge voltage, and output stability. In general, the lithium secondary battery may include a positive electrode, a negative electrode, a separator, and a non-aqueous electrolytic solution containing a lithium salt. The positive electrode may be manufactured, e.g., by applying a mixture of a positive electrode active material, a conductive material, and a binder onto a positive electrode current collector and/or an extended current collecting part and then drying, and when necessary, a filler may be further added to the mixture.

Generally, each of the positive electrode current collector and/or the extended current collecting part may have a thickness of about 3 μm to about 500 μm. The positive electrode current collector and the extended current collecting part are not particularly limited as long as they have high electrical conductivity without causing a chemical change in the corresponding battery. For example, the positive electrode collector and the extended current collecting part may be formed of stainless steel, aluminum, nickel, titanium, baking carbon or aluminum or stainless steel with a surface treated with carbon, nickel, titanium, or silver. The positive electrode current collector and the extended current collecting part may have an uneven surface to improve bonding strength with a positive active material and be manufactured in various forms such as a film, a sheet, foil, a net, a porous body, a foam body, and a non-woven fabric.

Examples of the positive electrode active material may include a layered compound such as a lithium cobalt oxide ($LiCoO_2$), a lithium nickel oxide ($LiNiO_2$), and 3-component-based lithium nickel manganese oxide (LiNi(X)Mn(y)Co(1−y)$O_2$ (where x=0.01−0.99, y=0.01−0.99, 0<x+y<1), or a compound substituted with one or more transition metals; a lithium manganese oxide such as Li1+x$Mn_2$−x$O_4$ (where, x=0−0.33), $LiMnO_3$, $LiMn_2O_3$, and $LiMnO_2$; a lithium copper oxide ($Li_2CuO_2$); a vanadium oxide such as $LiV_3O_8$, $LiFe_3O_4$, $V_2O_5$, and $Cu_2V_2O_7$; a Ni-site type lithium nickel oxide expressed by a chemical formula LiNi1−xMx$O_2$ (where M=Co, Mn, Al, Cu, Fe, Mg, B, or Ga, and x=0.01−0.3); a lithium manganese composite oxide expressed by a chemical formula $LiMn_2$−xMx$O_2$ (where M=Co, Ni, Fe, Cr, Zn, or Ta, and x=0.01−0.1) or a chemical formula $Li_2Mn_3MO_8$ (M=Fe, Co, Ni, Cu, or Zn); $LiMn_2O_4$ where a portion of the Li of the chemical formula is substituted with alkaline earth metal ions; a disulfide compound; and $Fe_2(MoO_4)_3$, but are not limited thereto.

Further, the conductive material may be added at about 1 wt % to about 30 wt % on the basis of a total weight of the mixture including the positive active material. The conductive material is not particularly limited as long as it has electrical conductivity without causing a chemical change in the corresponding battery. For example, the conductive material may include graphite such as natural graphite and artificial graphite; carbon black such as acetylene black, Ketjen black, channel black, furnace black, lamp black, and summer black; conductive fiber such as carbon fiber and metal fiber; metal powder such as carbon fluorine, aluminum, and nickel powder; conductive whisker such as zinc oxide and potassium titanate; conductive oxide such as titanium oxide; or derivative of polyphenylene.

The binder may be a substance that assists in binding of the active material and the conductive material and binding to the current collector, and may generally be added at about 1 wt % to about 30 wt % on the basis of the total weight of the mixture including the positive electrode active material. For example, the binder may include polyfluorovinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene-terpolymer (EPDM), sulfonated EPDM, stylene butylene rubber, fluoro rubber, and various copolymers.

The filler may be a substance for suppressing expansion of the positive electrode and selectively used, and is not particularly limited as long as it is a fibrous material without causing a chemical change in the corresponding battery. For example, the filler may include an olefin-based copolymer such as polyethylene and polypropylene; and a fibrous material such as a glass fiber and a carbon fiber.

The negative electrode may be manufactured by applying a negative electrode active material onto a negative current collector and/or an extended current collecting part and then drying, and when necessary, substances described above may be further selectively included.

In general, each of the positive electrode current collector and/or the extended current collecting part may have a thickness of about 3 μm to about 500 μm. The negative current collector and/or the extended current collecting part are not particularly limited as long as electrical conductivity is present without causing a chemical change in the corresponding battery. For example, the negative current collector may include copper, stainless steel, aluminum, nickel, titanium, baking carbon, copper or stainless steel with a surface treated with carbon, nickel, titanium, or silver, or an aluminum-cadmium alloy. Additionally, like the positive electrode current collector, the negative current collector may have an uneven surface to improve bonding strength with a negative active material and be manufactured in various forms such as a film, a sheet, foil, a net, a porous body, a foam body, and a non-woven fabric.

For example, the negative electrode active material may include carbon such as non-graphitized carbon and graphitized carbon; a metal composite oxide such as $LixFe_2O_3$ ($0 \le x \le 1$), $LixWO_2$ ($0 \le x \le 1$) and SnxMe1−xMe'yOz (Me: Mn, Fe, Pb, Ge; Me': Al, B, P, Si, Group I, II and III elements of the Periodic Table, halogen atoms; $0<x\le 1$; $1\le y\le 3$; and $1\le z\le 8$); a lithium metal; a lithium alloy; a silicon-based alloys; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; and a Li—Co—Ni based material.

The separator may be interposed between the positive electrode and the negative electrode and an insulating thin film having high ion permeability and mechanical strength may be used as the separator. The separator may typically include a pore diameter of about 0.01 μm to about 10 μm and a thickness of about 5 μm to about 300 μm. For example, the separator may include an olefin-based polymer such as polypropylene that has chemical resistance and hydrophobicity and a sheet or a non-woven fabric made of a glass fiber and polyethylene. When a solid electrolyte such as a polymer is used as the electrolyte, the solid electrolyte may serve as the separator.

The electrolytic solution may be the non-aqueous electrolytic solution containing the lithium salt, which includes the non-aqueous electrolytic solution and the lithium salt. The non-aqueous electrolytic solution may include a non-aqueous organic solution, an organic solid electrolyte, and an inorganic solid electrolyte, but is not limited thereto. For example, the non-aqueous electrolytic solution may include an aprotic organic solvent such as N-methyl-2-pyrrolidone, propylene carbonate, ethylene carbonate, butylene carbonate, dimethyl carbonate, diethyle carbonate, gamma-butyrolactone, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric acid tri-ester, trimethoxy methane, a dioxolane derivative, sulfolan, methyl sulfolan, 1,3-dimethyl-2-imidazolidinone, a propylene carbonate derivative, a tetrahydrofuran derivative, ether, methyl propionate, and ethyl propionate.

For example, the organic solid electrolyte may include a copolymer including a polyethylene derivative, a polyethylene oxide derivative, a polypropylene oxide derivative, a phosphoric acid ester polymer, poly agitation lysine, polyester sulfide, polyvinyl alcohol, poly vinylidene fluoride, or an ionic dissociable group. For example, the inorganic solid electrolyte may include an Li-based nitride such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$, a nitride, a halide, or a sulfate. For example, the lithium salt may include a material easily dissolved in the non-aqueous electrolyte, such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)2NLi$, lithium chloroborane, lithium lower aliphatic carbonate, lithium 4-phenyl borate, imide, and the like.

Further, the following compounds may be added to the non-aqueous electrolyte solution in order to improve discharge and charge characteristics and flame retardancy. Examples include pyridine, triethyl phosphite, triethanolamine, cyclic ether, ethylenediamine, n-glyme, hexaphosphoric triamide, a nitrobenzene derivative, sulfur, a quinone-imine dye, N-substituted oxazolidinone, N,N-substituted imidazolidine, ethylene glycol dialkyl ether, an ammonium salt, pyrrole, 2-methoxyethanol, and aluminum trichloride. In some cases, a halogen-containing solvent such as carbon tetrachloride and ethylene trifluoride may be further included so as to provide non-combustibility, a carbon dioxide gas may be further included to improve high-temperature storage characteristics, and fluoro-ethylene carbonate (FEC) and Propene sultone (PRS) may be further included.

For a specific example, lithium salt such as $LiPF_6$, $LiClO_4$, $LiBF_4$, and $LiN(SO_2CF_3)_2$ may be added to a mixed solvent of chain carbonate of DEC, DMC, or EMC, which is a low-viscous solvent such as ring-shaped carbonate of PC or EC that is a high dielectric solvent to prepare the non-aqueous electrolytic solution containing the lithium salt.

Figure 4:
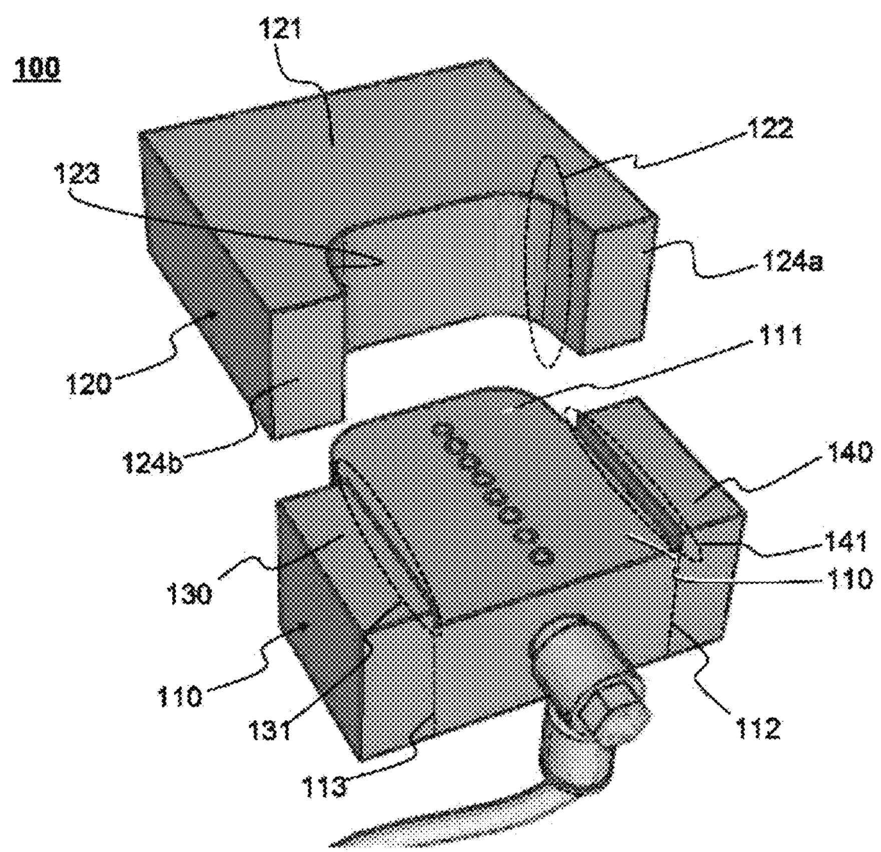
FIG. 4 is an exemplary view of a lead processing apparatus in accordance with an exemplary embodiment of the present disclosure.
Figure 5:
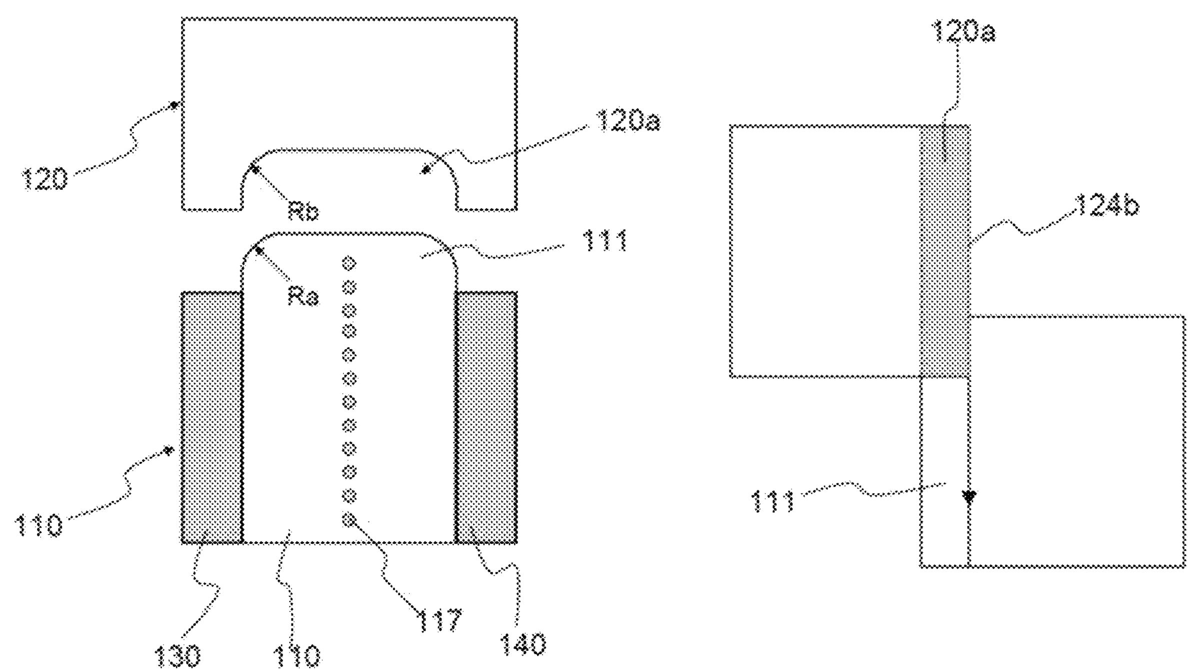
FIG. 5 is an exemplary view of the lead processing apparatus in accordance with an exemplary embodiment of the present disclosure.
Figure 6:
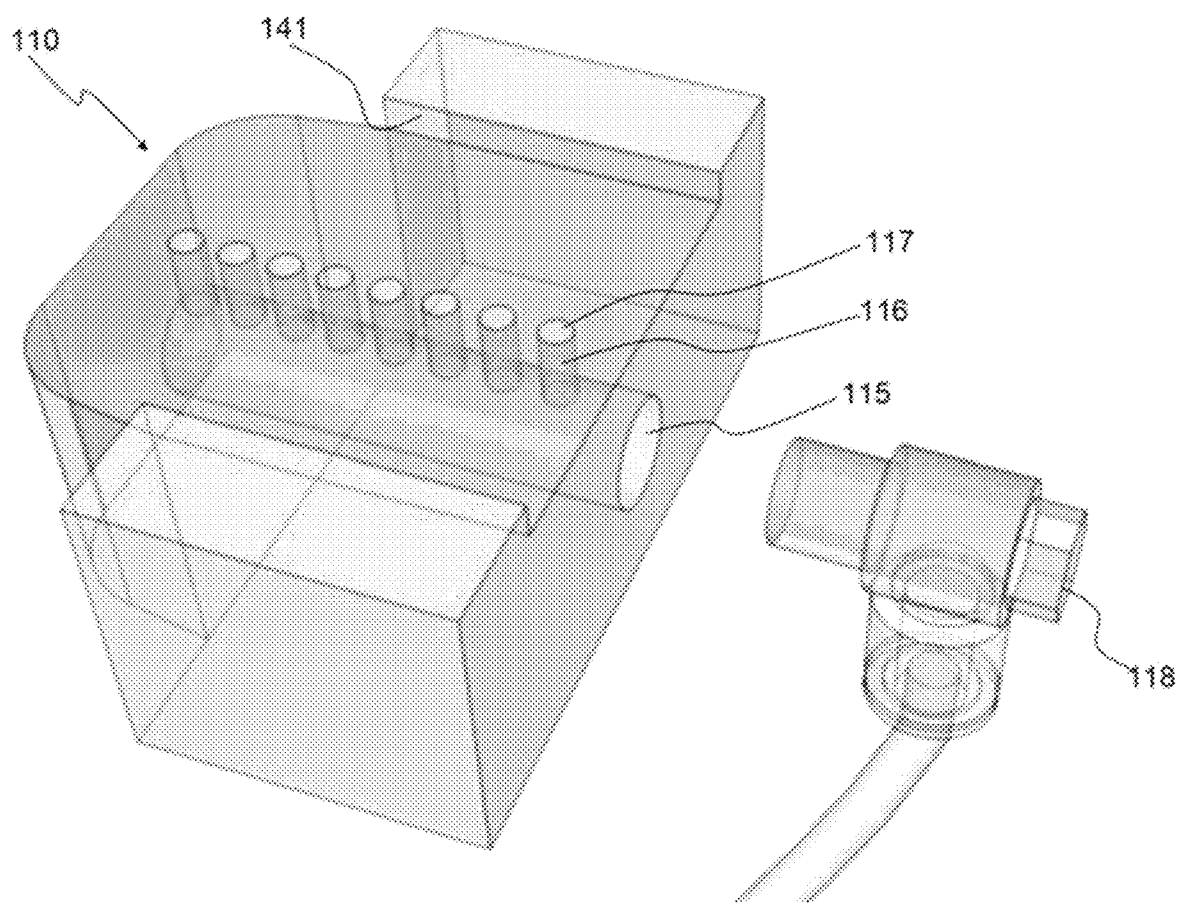
FIG. 6 is an exemplary view of a fixing die in accordance with an exemplary embodiment of the present disclosure.
Figure 7:
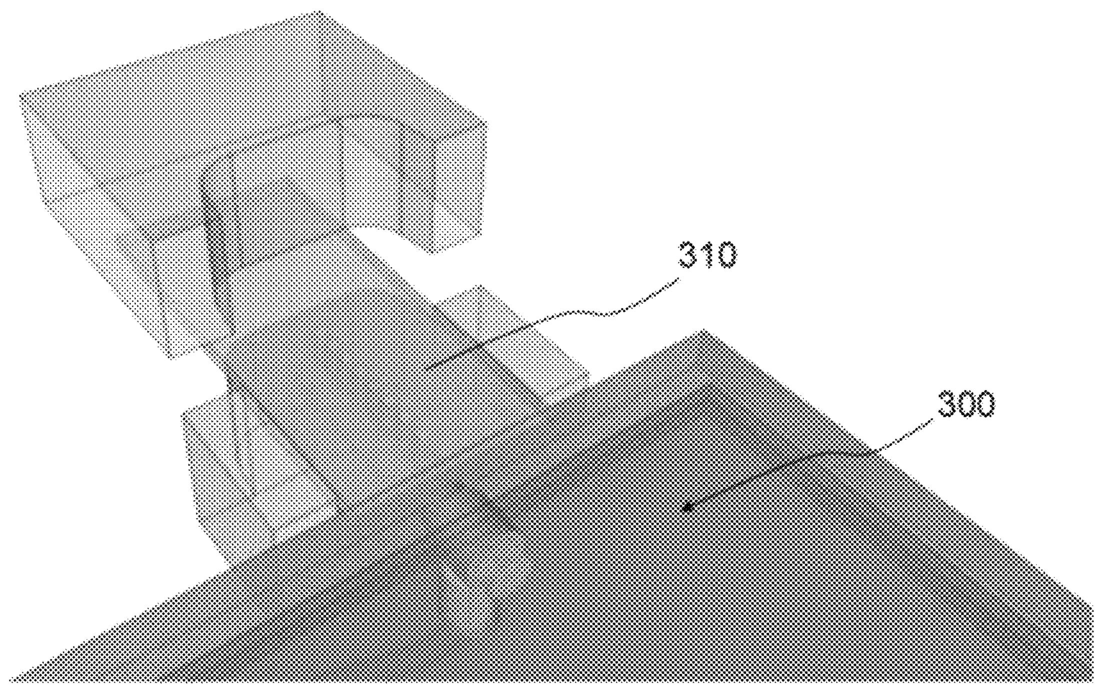
FIG. 7 is an exemplary view illustrating a state in which a preliminary lead is mounted on the lead processing apparatus in accordance with an exemplary embodiment of the present disclosure.

FIGS. 4 and 5 are exemplary views illustrating a lead processing apparatus in accordance with an exemplary embodiment of the present disclosure. FIG. 6 is an exemplary schematic view illustrating a fixing die. FIG. 7 is an exemplary view illustrating a preliminary lead mounted to the lead processing apparatus.

Referring to the above drawings, a lead processing apparatus 100 may include a fixing die 110 and a cutting jig 120 disposed adjacent to the fixing die 100. For example, the cutting jig 120 may be actuated in a downward direction to cross the fixing die 110 with respect to the fixing die 110. The cutting jig 120 may be actuated in an upward direction to return to an original position after the downward movement. The fixing die 110 may include a first die 110 having a fist end 111 and second and third ends 112 and 113 respectively extending from both sides of the first end 111 and on which a preliminary lead 310 is seated, a second die 140 integrated with and extending from the second end 112 and a third die 130 integrated with extending from the third end 113 in an integrated manner.

For example, the first end 111 may include a structure protruding to the exterior with respect to the second and third die 140 and 130 with reference to a length of the preliminary lead 310 and a corner of the first end 111 may have a round shape having a predetermined radius of curvature Ra on a plane. In the above-described structure, the cutting jig 120 may inlcude a structure simultaneously crossing the first end 111, the second die 140, and the third die 130 during actuation in the downward direction for cutting and the cutting may be performed by the actuation in the downward direction (e.g., downward movement), a portion of the cutting jig 120, which crosses the first end 111, may have a recessed shape corresponding to the shape of the first end 111. In other words, the cutting jig 120 may include curved surfaces 122 and 123 having a radius of curvature Rb that is approximately equal to that of the round shape of the first end 111. Accordingly, when the cutting jig 120 crosses the fixing die 110 by the downward movement for cutting, the preliminary lead 310 may be formed (e.g., cut) with the round corners of the first end 111 engaged with the cutting jig 120 and thus, the preliminary lead 310 may be formed into an electrode lead having a round shape.

Figure 8:
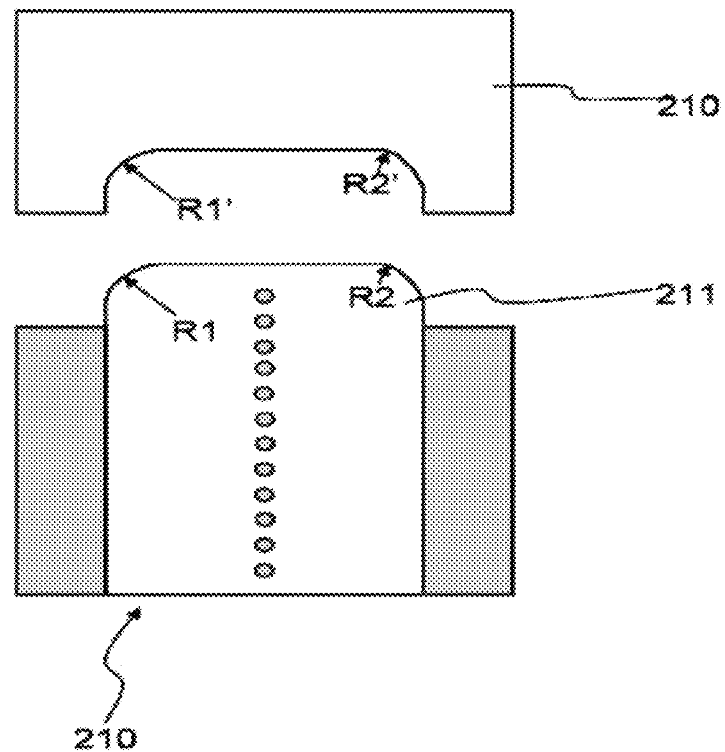
FIG. 8 is an exemplary views of a lead processing apparatus in accordance with in accordance with an exemplary embodiment of the present disclosure.

Further, FIG. 8 illustrates a lead processing apparatus 200 in accordance with another exemplary embodiment. In accordance with FIG. 8, although a first end 211 has two corners, the corners have round shapes having different radii of curvature R1 and R2. Additionally, the cutting jig 220 may have curved surfaces having radii of curvature R1' and R2' different from each other. Accordingly, in the above-described structure, when the cutting jig 220 crosses the fixing die 210 by the actuation in the downward direction (e.g., downward movement) for cutting, the preliminary lead 310 may be removed (e.g., cut) when the round corners of the first end 211 are engaged with the cutting jig 220 and the preliminary lead 310 may be formed into an electrode lead having a round shape. However, when the corners of the first end 111 have the radii of curvature different from each other, the electrode lead formed by the lead processing apparatus 200 in FIG. 7 may have the left and right round corners that are asymmetric to each other.

Referring to FIGS. 4 to 7 again, a first aperture 115 through which a gas flows is defined in the first die 110, and a plurality of second apertures 116 branched from the first aperture 115 are defined therein. Additionally, openings 117 respectively communicated with the second apertures 116 may be perforated in a surface of the first die 110. A vacuum pump 118 for pneumatic pressure drop may be connected to the first aperture 115. In the above-described structure, an interior of each of the first aperture 115 and the second aperture 116 may be converted into a vacuum state by the vacuum pump 118 when the preliminary lead 310 abuts the first die 110 and the openings 117 are sealed and the preliminary lead 310 is coupled on the first die 110 due to a vacuum pressure in accordance with the vacuum state.

The second die 140 may protrude in an upward direction from a surface of the first die 110 to form a first stepped portion 141 between the first die 110 and the second die 140. The third die 130 may protrude in an upward direction from the surface of the first die 110 to form a second stepped portion 131 between the first die 110 and the third die 130.

In the above-described structure, the preliminary lead 310 may be disposed (e.g., seated) on the first die 110 while abutting the first stepped portion 141 and the second stepped portion 131. The preliminary lead 310 may be obstructed (e.g., prevented) from moving in a direction toward the second die 140 and the third die 130 by the first stepped portion 141 and the second stepped portion 131 during the actuation in a downward direction (e.g., downward movement) of the cutting jig 120. The cutting jig 120 may include a jig main body 121, a pair of guide portions **124*a* and 124*b* integrated with and extending from the jig main body 121 at positions respectively corresponding to the second die 140 and the third die 130 and first and second curved portions 122 and 123 that are curved surfaces extending from the jig main body 121 to the guide portions 124*a* and 124*b* between the guide portions 124*a* and 124*b***.

The first curved portion 121 and the second curved portion 123 may be curved surfaces having radii of curvature Rb equal to that of the corners, which face thereto, of the first end 111 on a plane. In accordance with an exemplary embodiment, a recessed space (e.g., recessed cavity) **120*a* may be defined by the first and second curved portions 122 and 123 and the jig main body 121 between the guide portions 124*a* and 124*b* is a portion crossing the first end 111 of the fixing die 110** during the actuation in a downward direction (e.g., downward movement) for cutting.

During the downward movement of the cutting jig 120, when the preliminary lead 310 is removed as the first and second curved portions 122 and 123 are engaged with the corners of the first end 11, corners of the electrode lead may be formed. Additionally, when the preliminary lead 310 is formed a portion extending between the corners of the first end 111 may be engaged with the jig main body 121 and an end of the electrode lead between the corners may be. In other words, when the preliminary lead 310 is supported on the first end 111 having the round corners, as the cutting jig 120 having a planar shape corresponding to the round shape is actuated a downward direction (e.g., moves downward), the preliminary lead 310 may be removed and formed into an electrode lead shape including a round structure having the rest portion except for a supported portion of the preliminary lead 310 engaged with the cutting jig 120 and the fixing die 110.

The guide portions **124*a* and 124*b* may be configured to induce the cutting jig 120 to be actuated in a downward direction (e.g., move downward) with respect to the fixing die 110. As the guide portions 124*a* and 124*b* respectively abut the first die 110 and the second die 140 during the downward movement of the cutting jig 120, the cutting jig 120 may be induced to be actuated in a downward direction (e.g., move downward) with respect to the fixing die 110. Additionally, during the actuation (e.g., in a downward direction) of the cutting jig 120, when the preliminary lead 310 is engaged with each of the guide portions 124*a*** and 124*b* and side surfaces of the first end 111, a portion of side surfaces of the preliminary lead 310, which further protrudes from the side surfaces of the first end 111, may be removed.

FIGS. 9A and 9B are an exemplary view illustrating when the electrode leads 301 are formed by the lead processing apparatus 100. Referring to FIGS. 9A and 9B in conjunction with FIGS. 4 to 7, the electrode lead 301 of the battery cell may be formed to have round corners in correspondence to the round shape of the first and second curved surfaces 122 and 123 and the corners formed on the first end 111 of the lead processing apparatus 100. In other words, although the electrode lead may be separated from a PCB or an external electronic device by an external force (e.g., impact or vibration), since the corners having the round structure a battery case may be prevented from being damaged (e.g., tear) or may not damage a circuit or a device of the PCB or the external electric device, and the battery cell in accordance with an exemplary embodiment may have an extremely improved stability.

As described above, when the first end of the fixing die and the recessed portion of the cutting jig cross in a mutually corresponding manner at the cutting portion of the preliminary lead and the shape of crossing thereof has the round structure on the plane, the lead processing apparatus in accordance with the exemplary embodiments may form the electrode lead having the round structure by cutting the preliminary lead in correspondence thereto. Although the electrode lead, formed as described above, is separated from a PCB or an external electronic device by an external force (e.g., impact or vibration), when the corners having the round structure a battery case may not be damaged or may not damage a circuit or a device of the PCB or the external electric device, the electrode lead may not degrade the stability of the battery cell.

Although the exemplary embodiments of the present disclosure have been described, it is understood that the present disclosure should not be limited to these exemplary embodiments but various changes and modifications can be made by one ordinary skilled in the art within the spirit and scope of the present invention as hereinafter claimed.

What is claimed is:

1. A lead processing apparatus to process an electrode lead for an electric connection of a battery cell, the electrode lead having a predetermined length and shape, the lead processing apparatus comprising:

a fixing die configured to maintain a position of a preliminary lead when a portion to be removed from the preliminary lead protrudes from a first end of a side end of the fixing die: and a cutting jig configured to form the preliminary lead into an electrode lead shape of the electrode lead by removing the portion to be removed while a portion of the preliminary lead coupled to the fixing die remains on the fixing die, the cutting jig being actuated in a downward direction with respect to the fixing die, wherein a plurality of corners of the first end of the side end of the fixing die have a round shape on a plane, and a portion of the cutting jig, which crosses the first end during removal by actuation in the downward direction, is recessed in correspondence to the round shape of the plurality of corners of the first end, wherein the fixing die comprises:

a first die having the first end, a second end, and a third end, the second end and the third end respectively extending from opposite sides of the first end, and the preliminary lead is seated on the first die;

a second die integrated with and extending from the second end of the first die; and a third die integrated with and extending from the third end of the first die, and wherein the first end protrudes further away from the second and third ends with respect to the second and third dies and with reference to a length of the preliminary lead, and the cutting jig is configured to simultaneously cross the first end, the second die, and the third die during an actuation of the cutting jig in the downward direction for cutting the preliminary lead.

2. The lead processing apparatus of claim 1, wherein, when the cutting jig crosses the fixing die by actuation in the downward direction, the preliminary lead is removed when the round shape of the plurality of corners of the first end are engaged with the cutting jig and forms the electrode lead having round corners.

3. The lead processing apparatus of claim 1, wherein the cutting jig comprises:

a jig main body;

a pair of guide portions integrated with and extending from the jig main body at positions that correspond to the second die and the third die; and first and second curved portions that are curved surfaces extending from the jig main body to the guide portions and located between the guide portions, wherein a recessed space defined by the first and second curved portions and the jig main body between the guide portions crosses the first end of the fixing die during actuation of the cutting jig in the downward direction for cutting the preliminary lead.

4. The lead processing apparatus of claim 3, wherein, during the actuation of the cutting jig in the downward direction, round corners of the electrode lead are formed by cutting the preliminary lead when the first and second curved portions are engaged with the plurality of corners of the first end, and an end of the electrode lead, disposed between the plurality of corners of the first end, is formed by cutting the preliminary lead when an extended portion between the plurality of corners of the first end is engaged with the jig main body.

5. The lead processing apparatus of claim 3, wherein, during the actuation of the cutting jig in the downward direction, as the guide portions respectively abut the first and second dies, the cutting jig is translated in the downward direction with respect to the fixing die.

6. The lead processing apparatus of claim 5, wherein, during the actuation of the cutting jig in the downward direction, when the preliminary lead is engaged with each of the guide portions at side surfaces of the first end, a portion of side surfaces of the preliminary lead is removed.

7. The lead processing apparatus of claim 1, further comprising:

a first aperture through which a gas flows and a plurality of second apertures branched from the first aperture defined in the first die;

openings respectively communicated with the second apertures perforated in a surface of the first die; and a vacuum pump for pneumatic pressure drop coupled to the first aperture.

8. The lead processing apparatus of claim 7, wherein an interior of each of the first and second apertures are converted into a vacuum state by the vacuum pump when the preliminary lead abuts the first die to seal the plurality of second apertures, and the preliminary lead is coupled to the first die by a vacuum pressure during the vacuum state.

9. The lead processing apparatus of claim 1, wherein on a vertical cross-section of the fixing die, the second die protrudes in an upward direction with respect to a surface of the first die with the first die and the second die forming a first stepped portion with respect to each other, and the third die protrudes in an upward direction with respect to the surface of the first die with the first die and the third die forming a second stepped portion with respect to each other.

10. The lead processing apparatus of claim 9, wherein the preliminary lead is seated on the first die when the preliminary lead abuts the first and second stepped portions and is obstructed from moving by the first and second stepped portions during actuation in the downward direction of the cutting jig.

11. The lead processing apparatus of claim 9, wherein a distance between the first and second stepped portions is about 99% to 100% of a width of the preliminary lead, and a protruding height of each of the first and second stepped portions is about 100% to 110% of a thickness of the preliminary lead.

12. The lead processing apparatus of claim 1, wherein the round shape of the plurality of corners of the first end has a radius of curvature in the range of about 10R to 100R.

13. A battery cell comprising an electrode lead processed by the lead processing apparatus in accordance with claim 1, wherein each of corners of the electrode lead has a round shape having a radius of curvature in the range of about 10R to 100R on the plane.

* * * * *